(12) United States Patent
SenGupta et al.

(10) Patent No.: US 10,472,261 B2
(45) Date of Patent: Nov. 12, 2019

(54) CONTAMINANTS REMOVAL WITH SIMULTANEOUS DESALINATION USING CARBON DIOXIDE REGENERATED HYBRID ION EXCHANGER NANOMATERIALS

(71) Applicant: Lehigh University, Bethlehem, PA (US)

(72) Inventors: Arup K. SenGupta, Bethlehem, PA (US); Hang Dong, Bethlehem, PA (US); Michael German, Bethlehem, PA (US); Chelsey Shepsko, Englishtown, NJ (US)

(73) Assignee: LEHIGH UNIVERSITY, Bethlehem, PA (US)

( * ) Notice: Subject to any disclaimer, the term of this patent is extended or adjusted under 35 U.S.C. 154(b) by 0 days.

(21) Appl. No.: 15/934,548

(22) Filed: Mar. 23, 2018

(65) Prior Publication Data
US 2018/0273401 A1    Sep. 27, 2018

Related U.S. Application Data

(60) Provisional application No. 62/475,575, filed on Mar. 23, 2017.

(51) Int. Cl.
*C02F 1/42*      (2006.01)
*B01J 41/12*     (2017.01)
(Continued)

(52) U.S. Cl.
CPC .............. *C02F 1/42* (2013.01); *B01J 39/07* (2017.01); *B01J 41/12* (2013.01); *B01J 47/127* (2017.01);
(Continued)

(58) Field of Classification Search
None
See application file for complete search history.

(56) References Cited

U.S. PATENT DOCUMENTS

| | | |
|---|---|---|
| 9,120,093 B2 | 9/2015 | SenGupta et al. |
| 2013/0068624 A1* | 3/2013 | Hasegawa .............. B01D 57/02 204/632 |

OTHER PUBLICATIONS

Greenleaf et al., "Environmentally Benign Hardness Removal Using Ion-Exchange Fibers and Snowmelt", Environ. Sci. Technol. 2006, vol. 40, No. 1 pp. 370-376.

* cited by examiner

*Primary Examiner* — Chester T Barry
(74) *Attorney, Agent, or Firm* — Fisherbroyles, LLP

(57) ABSTRACT

A method for purifying waste water, and a dual chamber purification system, in which feed water may be passed first through a hybrid anion exchange unit, and subsequently through a weak acid cationic exchange unit. The hybrid anion exchanger may comprise a hybrid sorbent (HAIX-NanoZr) with dual functional sorption sites. The weak acid cationic exchanger may be a fiber having a shell-core physical configuration with relatively short intra-particle diffusion path length so that the ion exchange sites reside predominantly on the periphery. The system may be used to achieve partial desalination or TDS reduction and concurrent removal of target contaminants (e.g., phosphate, hardness). Further, the system may be regenerated using $CO_2$ as the sole regenerant for both the hybrid anion exchanger and the weak acid cationic exchanger, thus producing spent regenerant with no externally added chemicals.

25 Claims, 8 Drawing Sheets

(51) Int. Cl.
*B01J 39/07* (2017.01)
*B01J 47/127* (2017.01)
*C02F 101/16* (2006.01)
*C02F 101/10* (2006.01)
*C02F 101/12* (2006.01)
*C02F 101/14* (2006.01)
*C02F 101/20* (2006.01)
*C02F 103/06* (2006.01)

(52) U.S. Cl.
CPC .. *C02F 2001/422* (2013.01); *C02F 2001/425* (2013.01); *C02F 2101/101* (2013.01); *C02F 2101/103* (2013.01); *C02F 2101/105* (2013.01); *C02F 2101/12* (2013.01); *C02F 2101/14* (2013.01); *C02F 2101/163* (2013.01); *C02F 2101/203* (2013.01); *C02F 2101/206* (2013.01); *C02F 2103/06* (2013.01); *C02F 2301/08* (2013.01); *C02F 2303/16* (2013.01); *C02F 2305/08* (2013.01)

CONTAMINANTS REMOVAL WITH SIMULTANEOUS DESALINATION USING CARBON DIOXIDE REGENERATED HYBRID ION EXCHANGER NANOMATERIALS

CROSS-REFERENCE TO RELATED APPLICATION

This application claims the benefit of priority of U.S. Provisional Patent Application 62/475,575, filed Mar. 23, 2017, the entirety of which is hereby incorporated herein by reference.

FIELD OF THE INVENTION

The present invention relates generally to water purification and desalination systems, and more particularly to systems and methods for purifying and/or desalinating waste water using ion exchange systems.

BACKGROUND

There exists a need for purification of water, e.g., to product potable water and/or to otherwise remove contaminants and/or desalinate water. Anion exchange processes are the most universally practiced processes for removal of contaminants, such as nitrate. Upon exhaustion, the anion exchangers require intensive brine regeneration (10-15% NaCl), often on a daily basis, which is undesirable. Additionally, traditional anion exchangers have low selectivity on fluoride, phosphate and arsenic, and are thus ineffective in removing these contaminants. Recently, anion exchangers loaded with metal oxide have been reported for high selectivity on those ions, but it still requires intensive alkali consumption for generation of the ion exchange media, which is undesirable. Disposal of the chemical-laden regenerant poses difficulties, particularly for small purification systems. Brine waste from a nitrate removal system may be disposed of by deep well injection, but such a disposal method is expensive, often is not available locally and faces restrictions or bans in many states. The presence of high concentrations of brine in the spent regenerant is also a major problem for hardness removal by cation exchange softening processes. Such a practice is now banned in certain area.

What is needed is a purification process and apparatus that is capable of removing unwanted contaminants and desalinating water while also avoiding the problems associated with brine-based regeneration.

SUMMARY OF THE INVENTION

The present invention provides a purification apparatus and process useful for removing unwanted anionic and cationic species from water. In one embodiment, the purification system is adapted such that feedwater is passed through the system, over multiple beds of ion exchange media that are used in sequence to first remove anions via an anion exchanger, and to subsequently remove cations via a cation exchanger. The ion exchange media of the anion exchanger may comprise a hybrid sorbent (HAIX-NanoZr) with dual functional sorption sites. The ion exchange media of the cation exchanger may comprise a weak acid cationic exchange media, which may be in the form of a fiber having a shell-core physical configuration with relatively short intra-particle diffusion path length so that the ion exchange sites reside predominantly on the periphery. In one embodiment, the anion exchanger may contain a hybrid sorbent (HAIX-nanoZr) and weak acid cationic exchange fibers in protonated form, and the cation exchanger may contain weak acid cationic exchange fibers in protonated form. System in accordance with the present invention may be used to achieve partial desalination or TDS reduction and concurrent removal of target contaminants (e.g., phosphate, hardness). The system may be regenerated using $CO_2$ as the sole regenerant for both the hybrid anion exchanger and the weak acid cationic exchanger. Further, the system may be configured to produce a treated water stream free of electrolytes, and carbolic acid, and the carbolic acid produced during feed water treatment may be captured and used as the source/supply of CO2, which may be flowed in a reverse-direction through the purification apparatus for regeneration purposes. Anions and cations captured from the ion exchange media of the anion and cation exchangers during the regeneration process may be contained in a regeneration waste stream exiting the anion exchanger. Spent regenerant in the regeneration waste stream contains no externally added chemicals relative to the original feed water.

BRIEF DESCRIPTION OF THE DRAWINGS

The following detailed description of various embodiments of the invention will be better understood when read in conjunction with the appended drawings. For the purpose of illustrating the invention, certain embodiments are shown in the drawings. It should be understood, however, that the invention is not limited to the precise arrangements and instrumentalities of the embodiments shown in the drawings.

DETAILED DESCRIPTION

Figure 1:
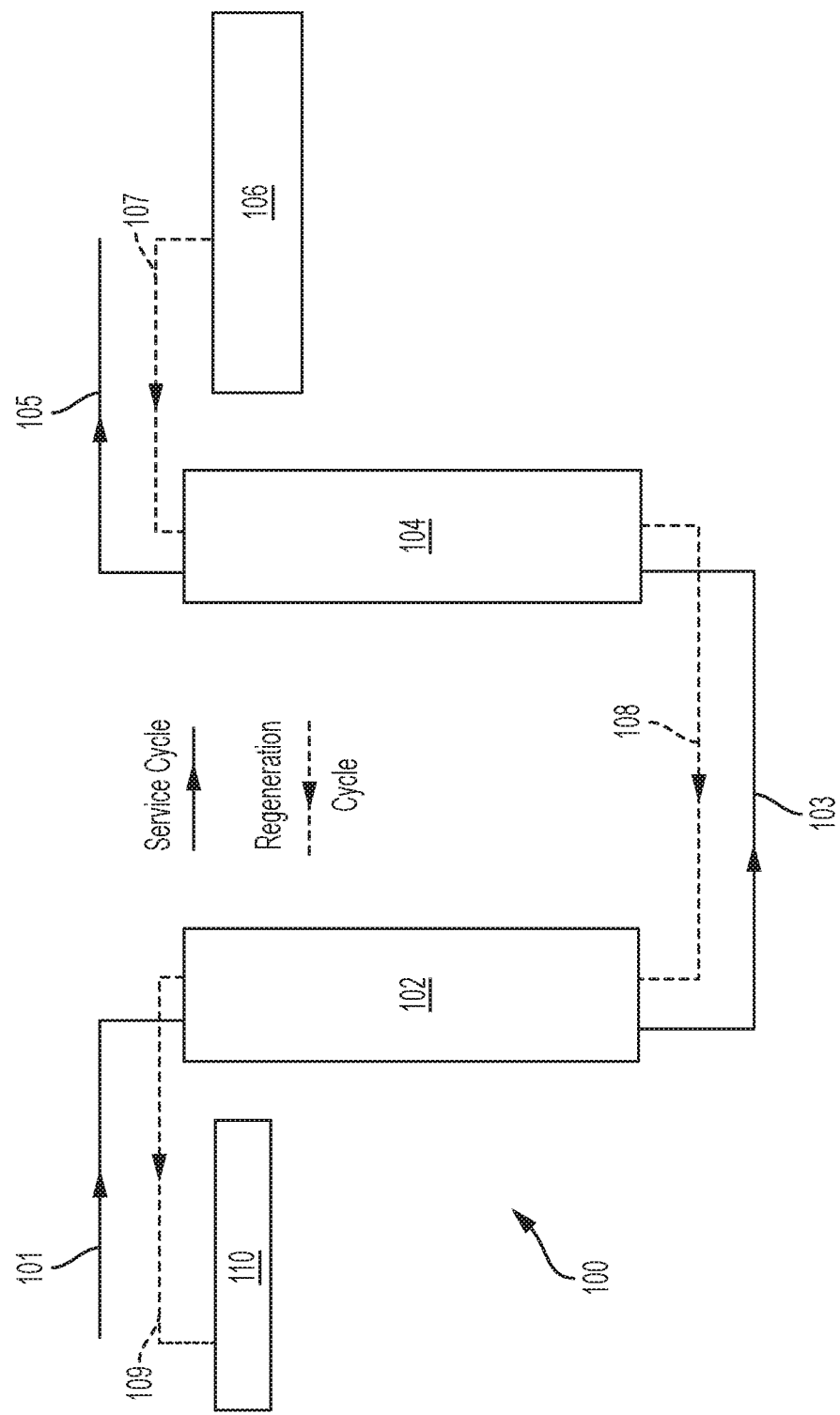
FIG. 1 is a block diagram of an exemplary apparatus for carrying out the disclosed process.

The materials, compounds, compositions, articles, and methods described herein may be understood more readily by reference to the following detailed description of specific aspects of the disclosed subject matter and the Examples included therein.

Before the present materials, compounds, compositions, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

All percentages, ratios and proportions herein are by weight, unless otherwise specified. All temperatures are in degrees Celsius (° C.) unless otherwise specified.

In this specification, and in the claims that follow, reference will be made to a number of terms that shall be defined to have the following meanings:

Throughout this specification, unless the context requires otherwise, the word "comprise," or variations such as "comprises" or "comprising," will be understood to imply the inclusion of a stated integer or step or group of integers or steps but not the exclusion of any other integer or step or group of integers or steps.

It must be noted that, as used in the specification and the appended claims, the singular forms "a," "an" and "the" include plural referents unless the context clearly dictates otherwise.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed, then "less than or equal to" the value, "greater than or equal to the value," and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Apparatus

In accordance with one aspect of the present invention, an apparatus for the purification of water is provided. The apparatus can remove unwanted anions and cations from feed water, or otherwise reduce the amounts of these ions to a desirable level, such as to a level approved by the EPA or WHO. Non-limiting examples of unwanted anions include fluoride, nitrate, sulfate, phosphate, arsenic in various oxidation states, as well as, chlorine. Non-limiting examples of cations include calcium, magnesium, barium, strontium, iron, manganese and the like.

Referring now to FIG. 1, a block diagram showing schematically components of the disclosed purification apparatus 100 is shown. As seen in FIG. 1, the exemplary water purification apparatus comprises a first ion exchanger 102 and a second ion exchanger 104 in fluid communication with the first ion exchange vessel.

The first ion exchange vessel 102 contains anion exchange media, is configured to receive an incoming flow of feed water to be purified as shown via line 101. The first vessel is in fluid communication with the second vessel for passing pre-treated effluent from the first vessel to the second vessel, as shown at 103. The first vessel is configured to deliver exiting waste during a regeneration cycle, as shown at 109.

The second ion exchange vessel 104 contains cation exchange media, and is configured to receive pre-treated effluent from the first vessel 102, as shown at 103, and to deliver a purified water effluent from the second vessel, as shown at 105. The second vessel 104 is fluid communication with a source of carbon dioxide 106, and adapted to receive carbon dioxide therefrom during the regeneration cycle, as shown at 107.

In one embodiment, the first vessel's anion exchange media comprises a HAIX-nanoZr hybrid anionic exchange resin and the second vessel contains a weak cationic exchange fiber. The amount of resin or fiber can be modified or otherwise adapted to the size of the vessel, the type of anions or cations to be removed or to the desired results of the formulator. In this embodiment, the first ion exchanger is adapted to remove from the feed water unwanted contaminants in the form of anions.

In certain embodiments, the anionic exchange media is a resin pre-saturated with bicarbonate ($HCO_3^-$) anions, and has the general form:

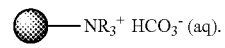—$NR_3^+$ $HCO_3^-$ (aq).

In one embodiment the resin further comprises zirconium hydroxide nanocrystals impregnated therein, for example, HAIX-nanoZr hybrid anionic exchange resin, graphically represented by the general form:

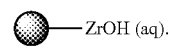—ZrOH (aq).

A detailed description of the HAIX-nanoZr hybrid resin can be found in U.S. Pat. No. 9,120,093 B2, the disclosure of which is hereby incorporated herein by reference.

The undesirable anions that are contained in the feed water entering ion exchange unit 102 displace bicarbonate from the hybrid anion exchange media/resin. The following is a non-limiting example of nitrate anion exchange:

Other non-limiting examples of anions that can displace bicarbonate anions, and thus be removed from the feed water by the anion exchanger 102, include chloride, sulfate, and the like. In addition, anions such as fluoride, phosphate and arsenate will adsorb to the zirconium hydroxide moieties of the hybrid anion exchange media/resin, and thus be removed from the feed water by the anion exchanger 102, as illustrated by the following example:

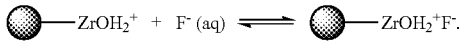

The service cycle begins with the introduction of water to be purified. In one embodiment, wherein first vessel contains only an anion exchange resin, any anions in the water to be purified exchange with the pre-loaded bicarbonate anions. As the effluent then exits the first vessel, the now-formed bicarbonate solution enters the second vessel, where the weak acid cationic exchange fibers protonate the bicarbonate to form carbolic acid, which will form $CO_2$ and $H_2O$ as the effluent exits the second vessel. A non-limiting example of anions that can be removed in this embodiment include $NO_3^-$, $SO_4^{2-}$ $Cl^-$, and $AsO_4^3$.

In one embodiment, the anion exchange resin is a HAIX-nanoZr resin. The following are non-limiting examples of anions that can be removed by this embodiment. $NO_3^-$, $SO_4^{2-}$ $Cl^-$, $F^-$, $PO_4^3$ and $AsO_4^{3-}$.

In another embodiment, in which the first vessel contains a first top layer of a weak acid cationic exchange fiber and a second bottom layer of an anion exchange resin, any anions in the water to be purified exchange with the pre-loaded bicarbonate anions. As the effluent then exits the first vessel, the now-formed bicarbonate solution enters the second vessel where the weak acid cationic exchange fibers protonate the bicarbonate to form carbolic acid, which will form $CO_2$ and $H_2O$ as the effluent exits the second vessel. A non-limiting example of anions that can be removed in this embodiment include $NO_3^-$, $SO_4^{2-}$ $Cl^-$, and $AsO_4^{3-}$ and $AsO_4^{3-}$. Non-limiting examples of cations that can be removed include $Ca^{2+}$, $Mg^{2+}$, $Sr^{2+}$, and $Ba^{2+}$. In this embodiment, the anion exchange resin may be a HAIX-nanoZr resin. The following are non-limiting examples of anions that can be removed by this embodiment. $NO_3^-$, $SO_4^{2-}$ $Cl^-$, $F^-$, $PO_4^{3-}$ and $AsO_4^{3-}$.

During a service cycle, as a result of inflow of feedwater into anion exchanger 102 and anion exchange with the anion exchange media of the anion exchanger 102, a pre-treated effluent is passed from the anion exchanger 102. The pre-treated effluent is a bicarbonate-containing effluent. This pre-treated effluent is passed from ion exchange unit 102 via line 103 into ion exchange unit 104, which contains a weak acid cation exchange fiber. The bicarbonate anions in the pre-treated effluent entering ion exchanger 104 exchange their cation counter ions (in this iteration, sodium cations) for protons as the pre-treated effluent contacts the weak ion exchange fibers, thereby converting the bicarbonate anions into carbolic acid. Accordingly, the pretreated effluent is passed into the second ion exchanger, which comprises a weak acid cation exchange fiber. As flow as the effluent exits vessel 2, the carbolic acid formed is released as water and carbon dioxide.

Depending upon the number of number of bed volumes entering the system, the treated effluent exiting ion exchanger 104 is free, or substantially free, of unwanted anions and cations. The treated effluent stream may be captured.

As will be appreciated by those skilled in the art, over time, the ion exchange media of ion exchange units 102 and 104 may decrease in efficiency or effectiveness as they become saturated with exchanged ions. At a certain point in time, as desired, it may become desirable to regenerate the ion exchange media by removing the unwanted ions from the ion exchange media. During a regeneration cycle, the system is back flushed with a flow in a reverse direction opposite to a direction of flow during the service cycle. This back flushing restores the ion exchange media to (or nearly to) their original states and prepares the system to receive more feed water to repeat the service cycle.

The regeneration cycle begins with injection of carbon dioxide from vessel 106, which contains pressurized carbon dioxide, e.g., pressurized at from 10 to 15 atmospheres pressure. During the regeneration cycle, the carbon dioxide from tank 106 enters ion exchange unit 104 via line 107 where it is converted to bicarbonate by the weak acid cationic exchange fibers. The bicarbonate thus formed enters ion exchange unit 102 via line 108 where the bicarbonate anions displace the anions now associated with the HAIX-nanoZr hybrid anion that were captured during the service cycle. Regeneration waste fluid containing the displaced anions is then carried away from ion exchange unit 102 through line 109 into waste vessel 110.

Accordingly, the anion exchange media and cation exchange media are regenerated by feeding CO2 into the second ion exchanger to form a bicarbonate solution by displacing cations associated with the cation exchange media of the second ion exchanger, and passing the bicarbonate solution through the first ion exchanger to cause bicarbonate anions in the bicarbonate solution to displace anions associated with the anionic exchange resin of the first ion exchanger and form a regeneration waste solution.

In accordance with another embodiment of the present invention, the system may further provide for desalinization of the feed water. For example, feed water containing $Ca^{2+}$, $Mg^{2+}$, $Sr^{2+}$, $Ba^{2+}$ and the like can have these cations removed by placement of a weak acid cationic exchange fiber above the HAIX-nanoZr hybrid anion exchange resin in the first ion exchange unit 102. These cations are removed by the process outlined below:

In such an embodiment, the first ion exchange vessel 102 may contain a first (e.g., lower) bed of HAIX-nanoZr hybrid anionic exchange resin and a second (e.g., upper) bed of weak cationic exchange fibers. In this embodiment, the first ion exchanger is adapted not only to remove from the feed water unwanted contaminants in the form of anions, but also to desalinate the water by removing unwanted cation contaminants.

In this embodiment, during the regeneration cycle, these cations are combined with bicarbonate or other anions exchanged from the HAIX-nanoZr hybrid anion exchange resin and delivered to waste vessel 110. This embodiment provides treated water that does not contain unwanted cations and anions. Use of dissolved $CO_2$ under pressure (i.e., $H_2CO_3$) allows restoration of the capacity of the cation exchange fibers by conversion into their original hydrogen form.

As such, at the end of the regeneration cycle, the anion exchange resin in the first vessel 102 is in the bicarbonate form, any cationic exchange resin or fibers in vessel 102 will be in the acid form, and cationic exchange resin or fibers in vessel 104 will be in its acid form.

In one embodiment, lines 103 and 108 can be the same, thereby removing the necessity of having two lines connecting vessels 102 and 104. In another embodiment, the apparatus can be configured such that lines 101 and 109 can be combined.

Process

In accordance with another aspect of the present invention, a process for the purification of water, to remove unwanted anions and cations, is provided. In one embodiment, the process comprises: introducing a source of water to be treated containing one or more anions, into a first vessel containing one or more anionic exchange media resins or fibers having a bicarbonate anion associated therewith; passing the water to be treated over the media to form a treated effluent containing bicarbonate ions; passing the treated effluent into a second vessel containing one or more weak cationic exchange resin fibers in protonated form to cause bicarbonate anions to be converted to carbolic acid; and collecting the treated effluent.

The anions removed by this aspect of the disclosed process include $NO_3^-$, $SO_4^{2-}$, and $Cl^-$. In one embodiment of this aspect, the first vessel contains a HAIX-nanoZr anionic exchange resin. The anions that can be removed by this embodiment of the disclosed process include $NO_3^-$, $SO_4^{2-}$ $Cl^-$, $F^-$, $PO_4^{3-}$ and $AsO_4^{3-}$. In one iteration of this aspect and the embodiments thereof, the carbolic acid in the second vessel forms carbon dioxide and water.

Another aspect of the disclosed process comprises: introducing a source of water to be treated into a first vessel containing one or more anionic exchange media resins or fibers and one or more cationic exchange media resins or fibers, said water comprising one or more anions and one or more cations, said anionic resins or fibers having a bicarbonate anion associated therewith, said cationic exchange resins or fibers being in protonated form; passing the water to be treated over said resins or fibers to form a treated effluent containing bicarbonate ions; passing the treated effluent into a second vessel containing one or more weak cationic exchange resin fibers in protonated form to cause bicarbonate anions to be converted to carbolic acid; and collecting the treated effluent.

In one embodiment of this aspect, the first vessel contains an upper level of weak cationic exchange fibers and a lower level of a HAIX-nanoZr anionic exchange resin. In another embodiment, the carbolic acid in the second vessel forms carbon dioxide and water.

The anions that can be removed by this embodiment of the disclosed process include $NO_3^-$, $SO_4^{2-}$ $Cl^-$, $F^-$, $PO_4^{3-}$ and $AsO_4^{3-}$. The cations that can be removed from the source of water include $Ca^{2+}$, $Mg^{2+}$, $Sr^{2+}$, and $Ba^{2+}$.

A further aspect of the disclosed process relates to a process that removes anions and/or cations and is then regenerated. The disclosed process comprises: introducing a source of water to be treated into a first vessel containing one or more anionic exchange resins or fibers, said water comprising one or more anions, said anionic resins or fibers having a bicarbonate anion associated therewith; passing the water to be treated over said resins or fibers to form a treated effluent containing bicarbonate ions; passing the treated effluent into a second vessel containing one or more weak cationic exchange resin fibers in protonated form to cause bicarbonate anions to be converted to carbolic acid; collecting the treated effluent; reversing the direction of effluent flow by injecting carbon dioxide into the second vessel to form a bicarbonate solution; passing the bicarbonate solution into the first vessel to cause bicarbonate anions to displace anions associated with the anionic exchange resin; and collecting the discharge exiting the first vessel.

A still further aspect of the disclosed process relates to a process that removes anions and/or cations and is then regenerated. The disclosed process comprises: introducing a source of water to be treated into a first vessel containing one or more anionic exchange resins or fibers and one or more cationic exchange resins or fibers, said water comprising one or more anions and one or more cations, said anionic resins or fibers having a bicarbonate anion associated therewith, said cationic exchange resins or fibers being in the protonated form; passing the water to be treated over said resins or fibers to form a treated effluent containing bicarbonate ions; passing the treated effluent into a second vessel containing one or more weak cationic exchange resin fibers in protonated form to cause bicarbonate anions to be converted to carbolic acid; collecting the treated effluent; reversing the direction of effluent flow by injecting carbon dioxide into the second vessel to form a bicarbonate solution; passing the bicarbonate solution into the first vessel to cause bicarbonate anions to displace anions associated with the anionic exchange resin; and collecting the discharge exiting the first vessel.

In one embodiment of this aspect, the first vessel contains an upper level of weak cationic exchange fibers and a lower level of a HAIX-nanoZr anionic exchange resin. In another embodiment the carbolic acid in the second vessel forms carbon dioxide and water.

The anions that can be removed by this embodiment of the disclosed process include $NO_3^-$, $SO_4^{2-}$ $Cl^-$, $F^-$, $PO_4^{3-}$ and $AsO_4^{3-}$. The cations that can be removed from the source of water include $Ca^{2+}$, $Mg^{2+}$, $Sr^{2+}$, and $Ba^{2+}$.

Without wishing to be limited by theory, $CO_2$ provides an opportunity to be used both as an acid (i.e., $H_2CO_3$) and a base ($HCO_3^-$) concurrently. In a traditional demineralization or deionization process with ion exchange resins, a cation exchanger in H-form is followed by an anion exchanger in OH-form and the process warrants use of mineral acids, for example, HCl or $H_2SO_4$ and strong alkali, for example, NaOH. The disclosed partial desalination or TDS reduction and concurrent target contaminants removal (e.g., phosphate, hardness) process using $CO_2$ as the sole regenerant may have one or more of the following distinctive characteristics: placement of an anion exchanger before a cation exchanger, in contrast to the sequence in traditional deionization units; use in the anion exchange of a hybrid sorbent, referred to as HAIX-NanoZr, with dual functional sorption sites; use of a weak-acid cation exchanger including a fiber having a shell-core physical configuration with relatively short intra-particle diffusion path length i.e., the ion exchange sites reside predominantly on the periphery; and use of CO2 as the sole regenerant for the entire process, thus producing spent regenerant with no externally added chemicals.

Figure 2:
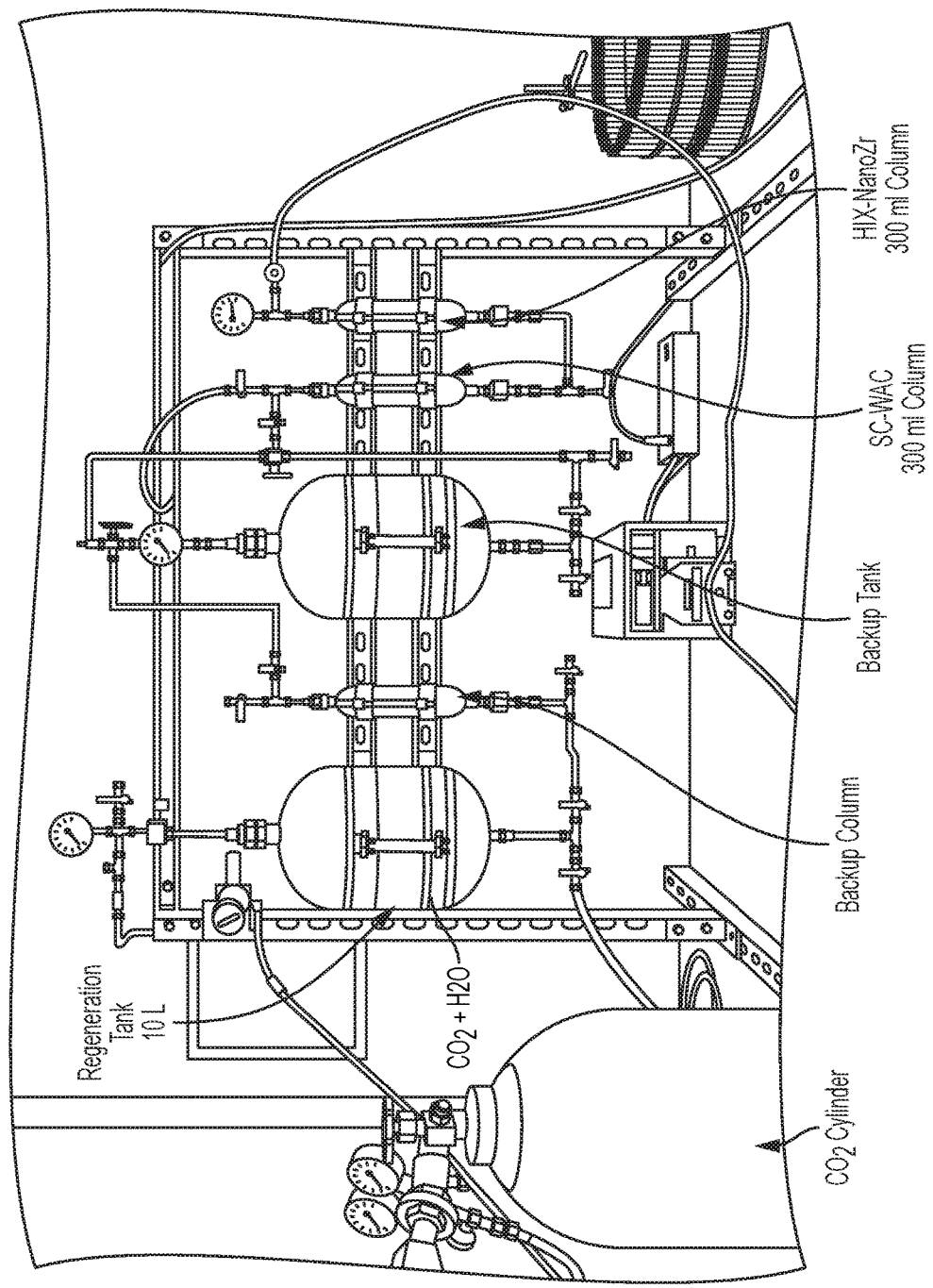
FIG. 2 is a photograph of an experimental unit according to the present disclosure which is capable of being configured to both remove unwanted anions and to also further desalinate the treated water.

FIG. 2 is a photograph of a skid mounted apparatus according to the present disclosure that is capable of being configured to both remove unwanted anions and to also further desalinate the treated water exiting via line 105. In one configuration, the apparatus can be used to remove both undesired cations and anions.

Without wishing to be limited by theory, as described herein the HAIX-nanoZr hybrid ion exchange resin has dual functional groups. Quaternary ammonium groups are strongly basic and can exchange chloride, nitrate and sulfate when pre-saturated with bicarbonate. In addition, the zirconium oxide nanoparticles can selectively remove phosphate, arsenic and fluoride. Fluoride, phosphate and arsenic sorption onto zirconium oxides and HAIX-nanoZr is correlates to the solution pH. The zero-point charge (ZPC) of zirconium oxide varies from pH from about 6 to about 8, with an average value of pH 6.5. Typical groundwater has pH 7.5-8.5, which is often greater than the ZPC of most zirconium oxides. At typical groundwater pH's, the influent water can deprotonate the zirconium oxides and desorb the fluoride, phosphate and arsenic from the media, and the resulting capacity would be very low. At an influent pH 3-6, however, the fluoride capacity of zirconium oxides is much higher. Thus, after desalination and pH reduction (i.e., pH<6) by placing a protonated weak acid cation exchange fiber at the top of the HAIX-nanoZr in vessel 102 and consequent pH reduction, the fluoride removal efficiency is increased.

Figure 3:
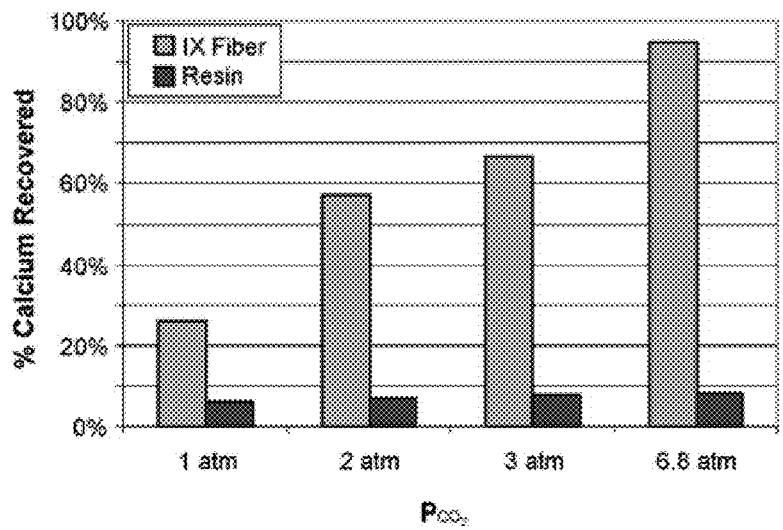
FIG. 3 depicts the relative performance of weak acid cationic exchange beads versus fibers for hardness regeneration at various $CO_2$ pressures during the regeneration cycle.
Figure 4:
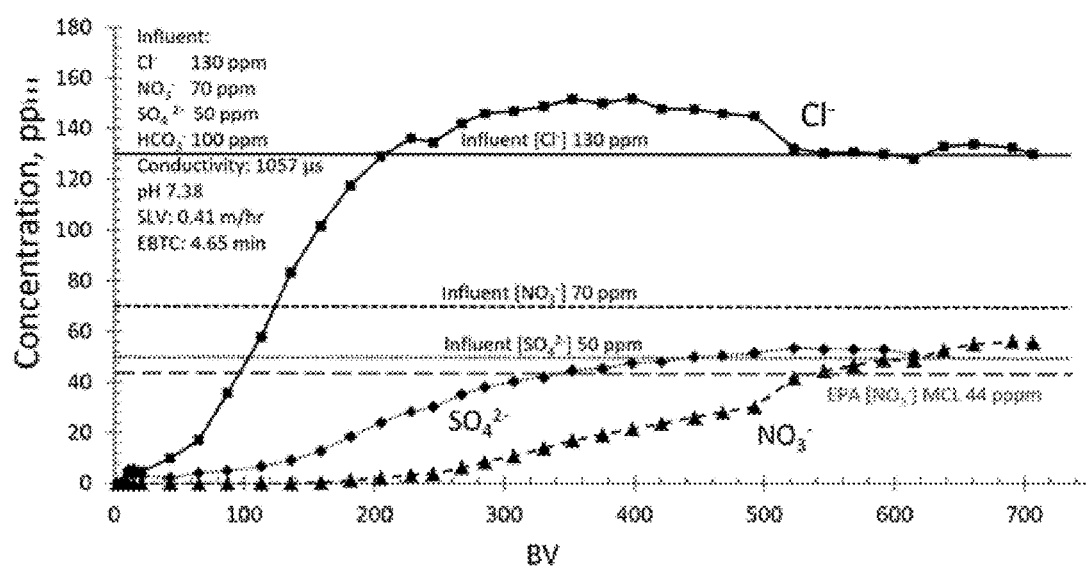
FIG. 4 depicts the effectiveness of the disclosed process for removal of $NO_3^-$ and $SO_4^{2-}$ from groundwater.
Figure 5:
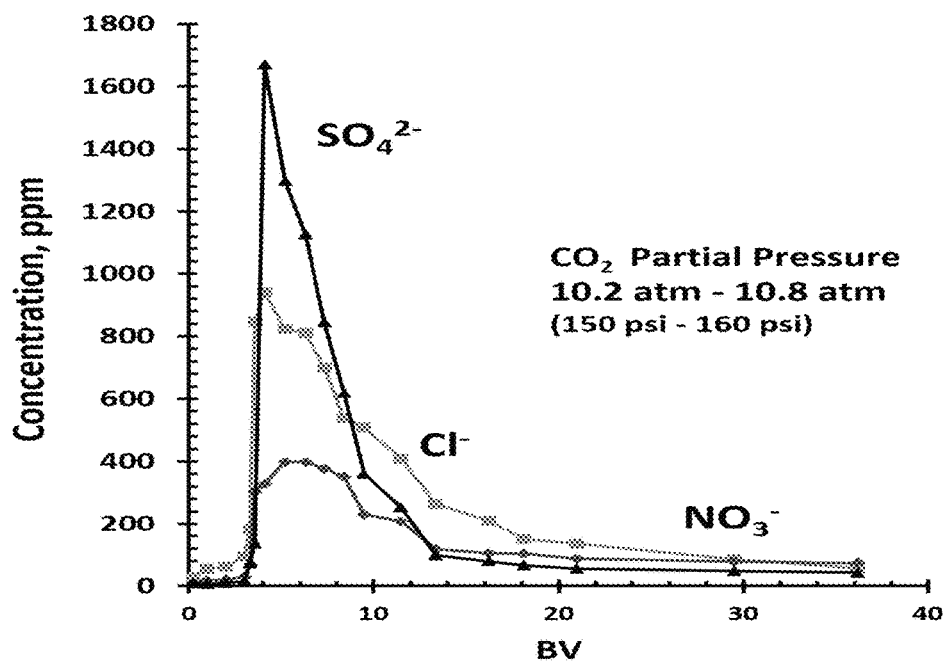
FIG. 5 depicts the elution curves of sulfate and chloride after regeneration of the system with $CO_2$ at 15 atm.

FIG. 3 depicts the relative performance of weak acid cationic exchange beads versus fibers for hardness regeneration at various $CO_2$ pressures during the regeneration cycle. As seen in FIG. 3 the percentage of $Ca^{2+}$ cation recovery increases with increasing $CO_2$ pressure whereas the bead efficiency is relatively constant. FIG. 4 depicts the effectiveness of the disclosed process for removal of $NO_3^-$ and $SO_4^{2-}$ from groundwater. The test sample comprised $Cl^-$ [130 ppm], $NO_3^-$ [70 ppm], $SO_4^{2-}$ [50 ppm], and $HCO_3^-$ [100 ppm]. At 200 Bed Volumes (BV) nitrate is absent in the effluent exiting the system. The level of nitrate present in the exiting water does not reach the EPA limit of 44 ppm until approximately 540 BV and never exceeds about 55 ppm. As such, the formulator wishing to provide water that is absent nitrate would stop the process, in this example, at about 200 BV and regenerate the system. FIG. 5 depicts the elution curves of sulfate and chloride after regeneration of the system with $CO_2$ at 15 atm.

Figure 6:
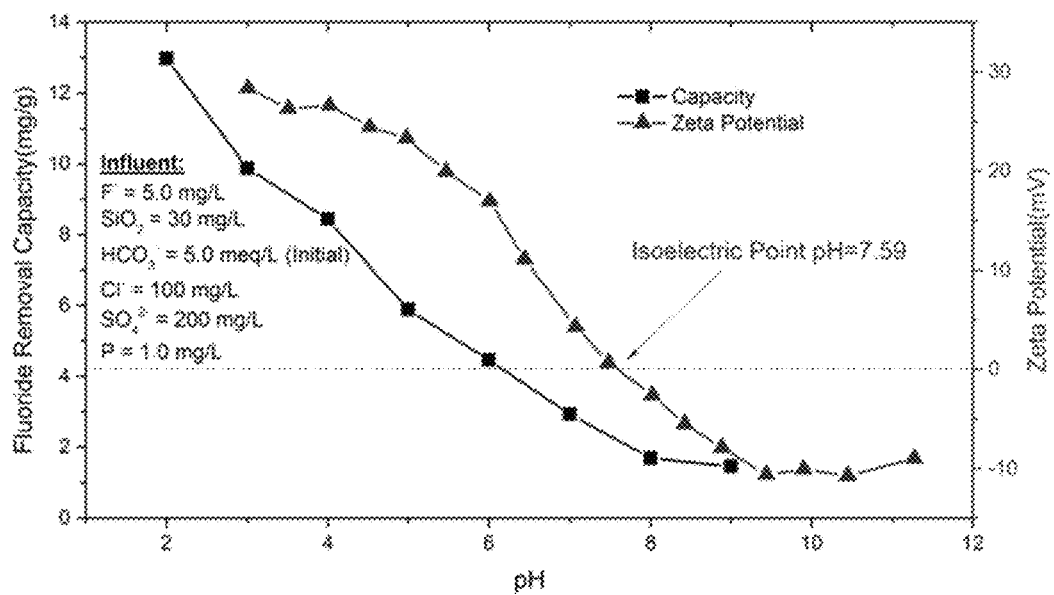
FIG. 6 depicts the fluoride ion removal capacity (mg/g) for a disclosed experimental influent versus the zeta potential.

FIG. 6 depicts the fluoride ion removal capacity (mg/g) for this experimental solution versus the zeta potential. The capacity correlates well with the zeta potential in response to increasing pH demonstrating an increase in fluoride removal capacity with a decrease in pH. The same trend is observed for phosphate.

Figure 7:
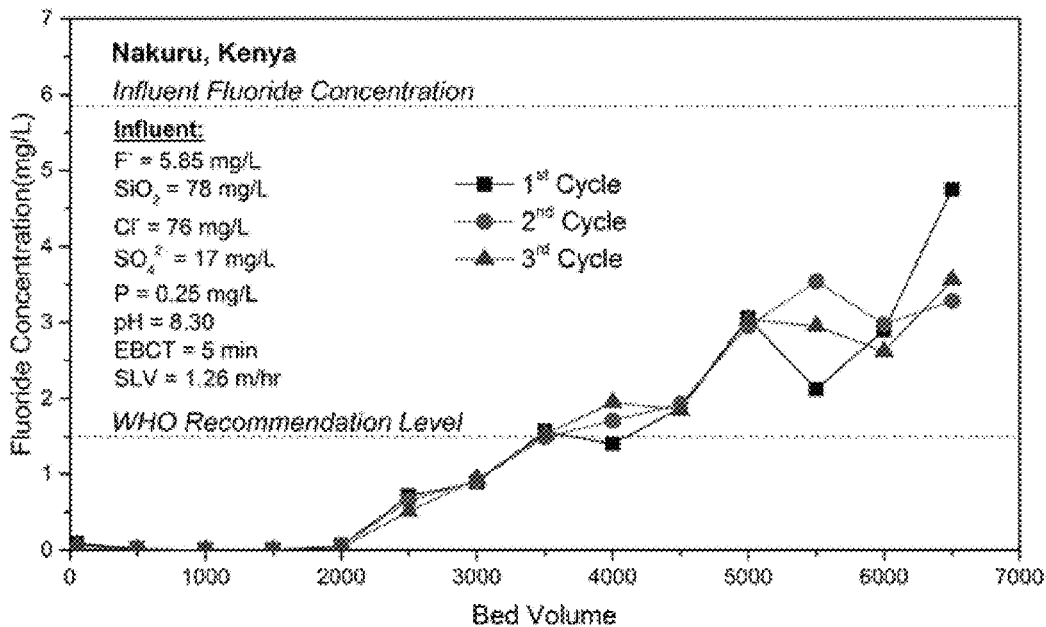
FIG. 7 depicts the fluoride ion content of a ground water sample obtained from Nakuru, Kenya.

FIG. 7 depicts the fluoride ion content of an actual ground water sample obtained from Nakuru, Kenya. The influent comprised $Cl^-$ [76 mg/L], $SO_4^{2-}$ [17 mg/L], $SiO_2$ [78 mg/L], $F^-$ [5.85 mg/L] and $PO_4^{3-}$ [0.25 mg/L] at a pH of 8.3. Over the 3 cycles the WHO threshold for fluoride ion of 1.5 mg/L was consistently achieved at 350 BV, thereby indicating the sustainability of the disclosed process to repeatedly obtain the desired level of fluoride ion in the exiting water.

For the following example, shell-core weak-acid (SC-WAC) ion exchange resins were obtained from Purolite Co. and the depth of functionalization was approximately 100 µm, i.e., intra-particle diffusion path length was much shorter than the average bead diameter of 600 µm. A bench top stainless steel set-up with 300 mL vessels and pressurized 10 liter $CO_2$ regeneration tanks were utilized along with $CO_2$ cylinder.

The influent wastewater used in this example was collected in a 20 L batch from the secondary effluent at the Bethlehem Wastewater Treatment Plant in Bethlehem, Pa. After collection, the influent batch was filtered through an 11 µm retention filter prior to running through the apparatus. Calcium and sodium were analyzed by a Perkin Elmer AAnalyst 200 Atomic Absorption Spectrometer (AAS). Sulfate, chloride and nitrate were analyzed using Dionex Ion Chromatography (IC model ICS-1000) with an IonPac® AS14 column; the eluent for the IC was 5 mM $NaHCO_3$. Phosphorus was analyzed using the Perkin Elmer Optima 2100 DV ICP-OES. Total dissolved solids or TDS for the water is measured through conductivity using a conductivity detector (Fisherbrand™ Accumet™ AP75). To monitor the changes in the progression of phosphate loading in HAIX-NanoZr beads between the service cycle and the regeneration cycle, slices of the beads (parent, exhausted, and regenerated) were prepared using microtomy and characterized by scanning electron microscopy with energy dispersive x-ray (SEM-EDX) spectroscopy (Model Hitachi JSM-4300).

Figure 8:
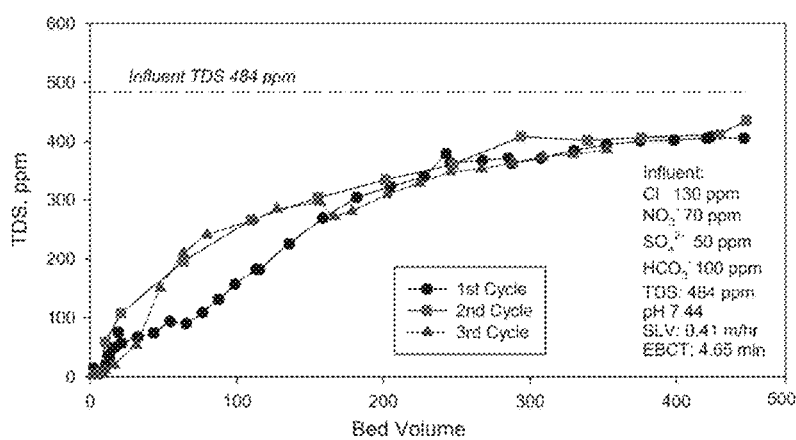
FIG. 8 shows results of total dissolved solids removal over three consecutive cycles of operation with the same feed of waste water obtained from the Bethlehem, Pa. waste water plant.
Figure 9:
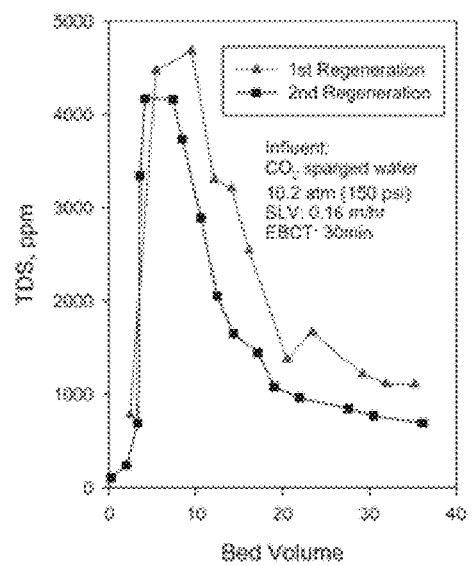
FIG. 9 represents the elution curves for two consecutive regenerations undertaken between the service runs for the Bethlehem, Pa. sample.
Figure 10:
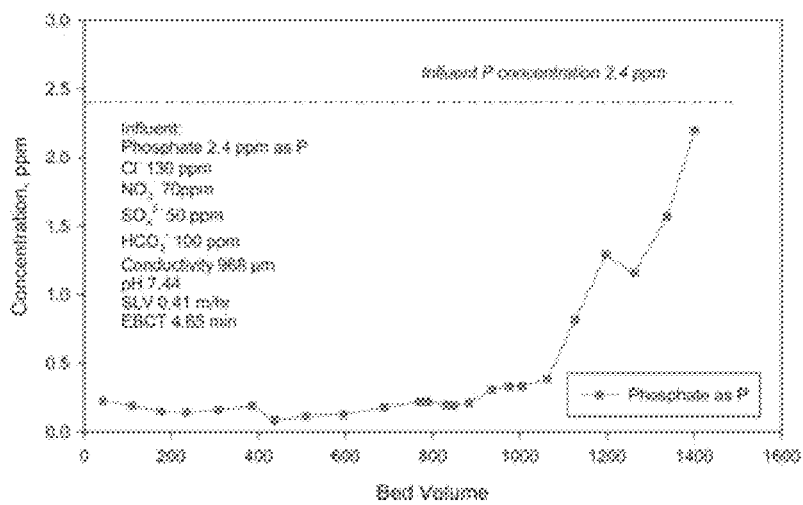
FIG. 10 depicts the phosphate effluent history for the Bethlehem, Pa. feed wastewater.

FIG. 8 shows results of total dissolved solids removal over three consecutive cycles of operation with the same feed of treated waste water from the Bethlehem plant in Pennsylvania. This waste water contained chloride [130 ppm], nitrate [70 ppm], sulfate [50 ppm], a pH of 7.44 and 484 mg/L total dissolved solids. As depicted in FIG. 8, that for three consecutive cycles, with the process using $CO_2$ as the sole regenerant, more than 50% TDS removal was consistently observed for in excess of 200 bed volumes. In addition, hardness, sulfate and phosphate, each being fouling agents for reverse osmosis (RO) membranes, were removed more efficiently than $Na^+$ and $Cl^-$. FIG. 9 represents the elution curves for two consecutive regenerations undertaken between the service runs. The second column, SC-WAC resin, was regenerated first with $CO_2$ to desorb cations, e.g., $Ca^{2+}$ and $Na^+$ and the resulting bicarbonate ($HCO_3^-$) then desorbs sulfate, chloride etc. from the first column. From the mass balance, TDS recovery during regeneration with 20 bed volumes (BVs) was satisfactory and the three consecutive service cycle runs provided nearly identical effluent histories with the same TDS reduction values as shown in FIG. 8. FIG. 10 depicts the phosphate effluent history for the feed wastewater. The phosphate removal continues for a much longer time, i.e., over 1000 bed volumes. Phosphate is sorbed onto surface exchange sites of hydrated zirconium oxide nanoparticles and is not amenable to desorption during $CO_2$ regeneration. Thus, in the case of high phosphate loads or phosphate fouling, the HAIX-NanoZr can be intermittently regenerated with KOH to recover nearly 95% of the phosphorus as potassium phosphate ($K_2HPO_4$), a potential high value fertilizer, without generating any secondary waste stream.

Figure 11:
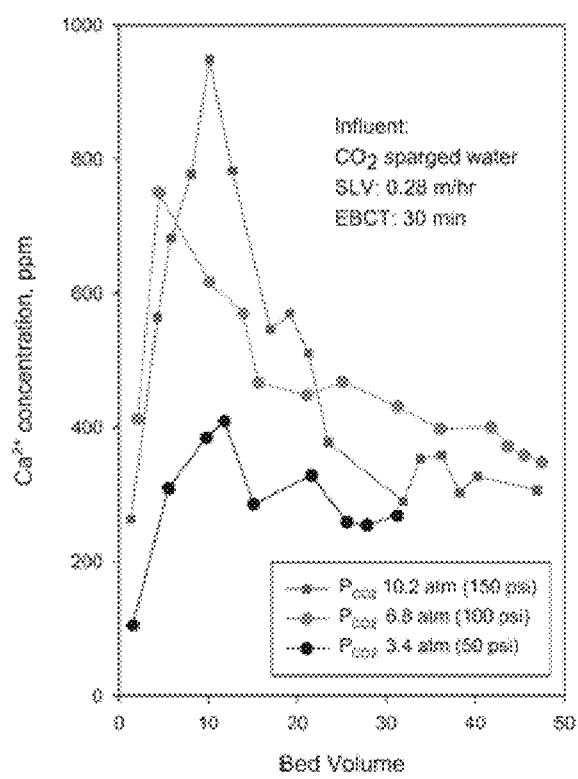
FIG. 11 demonstrates that the efficiency of regeneration of the disclosed process increases with the $CO_2$ pressure.

FIG. 11 demonstrates that efficiency of regeneration of the system increases with the $CO_2$ pressure. As seen in FIG. 11, the calcium ion concentration of the effluent is higher at 10.2 atmospheres (~960 ppm), whereas 3.4 atmospheres results in approximately 400 ppm.

Figure 12:
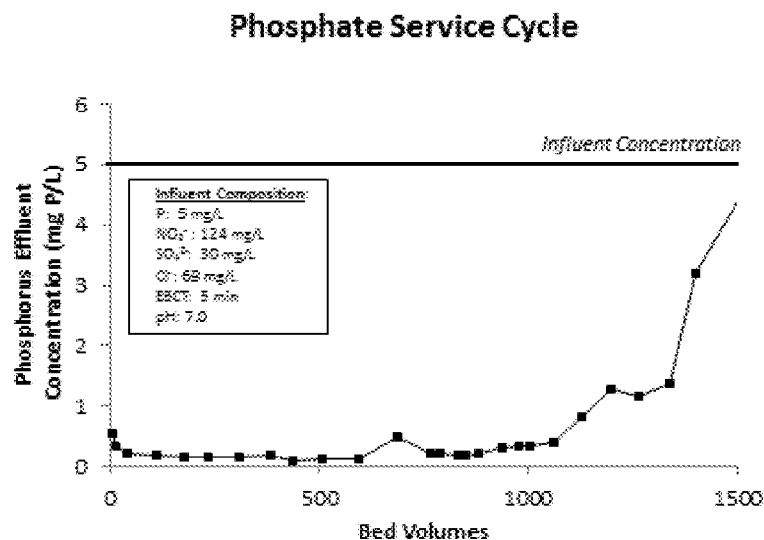
FIG. 12 discloses the results of phosphate removal during a service cycle. At 1000 bed volumes phosphate is continuing to be removed from the influent.
Figure 13:
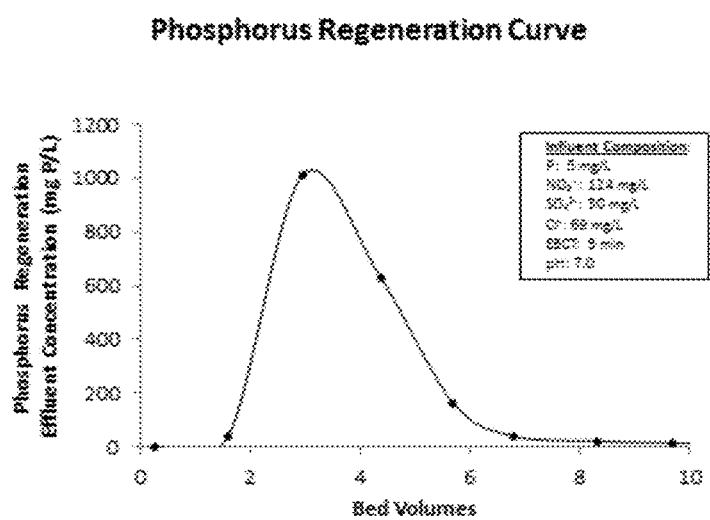
FIG. 13 discloses the results of phosphate collection during a regeneration cycle wherein the regenerating solution is 2% KOH with only approximately 6 bed volumes.

FIG. 12 discloses the results of phosphate removal during the service cycle. At 1000 bed volumes phosphate is continuing to be removed from the influent. FIG. 13 discloses the results of phosphate collection during a regeneration cycle wherein the regenerating solution is 2% KOH with only approximately 6 bed volumes. Waste water having a high phosphorous content can be purified and the removed phosphorous can be collected and utilized as a fertilizer.

Preparation of Hybrid Resin HAIX-NanoZr

For a complete description and characterization of the hybrid resins disclosed herein see, U.S. Pat. No. 9,120,093 B2, which is incorporated herein by reference. As a first step, zirconium oxide dissolved in 10% sulfuric acid is loaded onto an anion exchange resin with quaternary ammonium functional groups in chloride form. Any suitable anion exchange resin or fiber is suitable for in modification to HAIX-nanoZr hybrid resin. In this example, an anionic resin available from The Purolite Company of Bala Cynwyd, Pa. was used. The loading of the polymeric ion exchange resin beads or fibers was carried out by shaking the mixed resin and zirconium solution in the rotary shaker. In one embodiment, particles sizes of the anion exchange resin beads are in the range from 300 μm to 1000 μm and the diameter of anion exchange fibers can varied in the range from 20 μm to 100 μm. The second step is impregnation of hydrated zirconium oxide into the pore structure of the anion exchange resin. During this step, the decanted resin from step 1 is brought into contact with alkaline solution. The third step is washing and drying. Anion exchanger beads or fibers from the second step are washed with tap water followed by acetone wash, and air dried for 24 hours. These steps can be repeated to achieve greater Zr(IV) loading. HZrO agglomerates were irreversibly encapsulated within the spherical anion exchanger beads. Turbulence and mechanical stirring do not result in any noticeable loss of HZrO particles. Both gel and macroporous anion exchanger (Purolite A-400 and A-500P) were prepared. Mass loading of HZrO onto the anion exchanger varied from 10-15% as Zr.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A process for purifying water, said process comprising:
removing one or more anions from a supply of feed water by feeding said feed water into a first ion exchanger, said first ion exchanger comprising anion exchange media, under conditions sufficient to exchange said one or more anions in said feed water with bicarbonate anions in said anion exchange media to form a pretreated effluent containing bicarbonate ions; and
passing the pretreated effluent into a second ion exchanger, said second ion exchanger comprising cation exchange media in protonated form, under conditions sufficient to cause bicarbonate ions in said pretreated effluent to form carbolic acid in a treated effluent stream.

2. The process of claim 1, further comprising: collecting the treated effluent stream.

3. The process of claim 2, wherein the treated effluent stream is free of nitrate.

4. The process of claim 1, further comprising:
regenerating said anion exchange media and said cation exchange media by feeding $CO_2$ into the second ion exchanger to form a bicarbonate solution by displacing cations associated with the cation exchange media of the second ion exchanger, and passing the bicarbonate solution through the first ion exchanger to cause bicarbonate anions in the bicarbonate solution to displace anions associated with the anionic exchange resin of the first ion exchanger and form a regeneration waste solution.

5. The process of claim 4, wherein regenerating said anion exchange media and said cation exchange media comprises:
reversing the direction of effluent flow by injecting carbon dioxide into the second ion exchanger to form the bicarbonate solution.

6. The process of claim 4, further comprising:
collecting regeneration waste solution from the first ion exchanger.

7. The process of claim 1, wherein said anion exchange media comprises one or more anionic exchange resins.

8. The process of claim 1, wherein said anion exchange media comprises one or more anionic exchange fibers.

9. The process of claim 1, wherein feeding said feed water into a first ion exchanger comprises feeding said feed water into a first vessel containing a HAIX-nanoZr anion exchange resin.

10. The process of claim 1, wherein passing the pretreated effluent into a second ion exchanger comprises passing the pretreated effluent into a second vessel containing a weak acid cation exchange fiber.

11. A process for removing anions and cations from water, comprising:
introducing a source of water to be treated into a first vessel having a bottom layer containing a HAIX-nanoZr anion exchange resin and a top layer containing a weak acid cationic exchange fiber, said water comprising one or more anions selected from the group consisting of nitrate, sulfate, chloride, fluoride and phosphate, and said water comprising one or more cations selected from the group consisting of calcium, magnesium, strontium and barium, said anionic resin having a bicarbonate anion associated therewith, said cationic exchange fiber being in protonated form;
passing the water to be treated over said fibers and resins to form a treated effluent containing bicarbonate ions;
passing the treated effluent into a second vessel containing weak acid cationic exchange fibers in protonated form to convert bicarbonate anions to carbolic acid, $H_2CO_3$;
collecting the treated effluent;
reversing a direction of effluent flow by injecting carbon dioxide into the second vessel to form a bicarbonate solution;
passing the bicarbonate solution into the first vessel to cause bicarbonate anions to displace anions associated with the HAIX-nanoZr anion exchange resin; and
collecting a discharge exiting the first vessel.

12. The process of claim 11, wherein said water comprises one or more cations selected from the group consisting of $Ca^{2+}$, $Mg^{2+}$, $Sr^{2+}$, and $Ba^{2+}$.

13. The process of claim 11, wherein said water comprises one or more anions selected from the group consisting of $NO_3^-$, $SO_4^{2-}$, $Cl^-$, $F^-$, $PO_4^{3-}$ and $AsO_4^{3-}$.

14. The process of claim 11, wherein the carbon dioxide is injected at a pressure of from about from 10 to 15 atmospheres.

15. The process of claim 11, wherein the treated effluent is free of nitrate after about 200 bed volumes.

16. A water purification apparatus, comprising:
a first vessel containing anion exchange media, the first vessel being configured to receive an incoming effluent to be purified, said first vessel being in fluid communication with a second vessel for passing pre-treated effluent from the first vessel to the second vessel, the first vessel being further configured to deliver exiting waste during a regeneration cycle; and
a second vessel containing cation exchange media, said second vessel being configured to receive pre-treated effluent from said first vessel and to deliver a purified water effluent from said second vessel, said second vessel further being in fluid communication with a source of carbon dioxide, and adapted to receive carbon dioxide therefrom during the regeneration cycle.

17. The apparatus of claim 16, further comprising a discharge vessel in fluid communication with said first vessel for receiving the purified water effluent therefrom.

18. The apparatus of claim 16, wherein said first vessel contains HAIX-nanoZr anion exchange resin.

19. The apparatus of claim 18, wherein $NO_3^-$ anions are removed in the first 200 bed volumes.

20. The apparatus of claim 16, wherein said first vessel contains a first bed of weak acid cationic exchange fiber and a second bed of HAIX-nanoZr anion exchange resin.

21. The apparatus of claim 20, wherein cations are removed from the incoming effluent in the first vessel, said cations being selected from a group consisting of $Ca^{2+}$, $Mg^{2+}$, $Sr^{2+}$, and $Ba^{2+}$.

22. The apparatus of claim 20, wherein anions are removed from the incoming effluent in the first vessel, said anions being selected from a group consisting of $NO_3^-$, $SO_4^{2-}$ $Cl^-$, $F^-$, $PO_4^{3-}$ and $AsO_4^{3-}$.

23. The apparatus of claim 16, wherein said second vessel contains a weak acid cationic exchange fiber.

24. The apparatus of claim 16, wherein said first vessel is further configured to be in fluid communication with a source of strong base.

25. The apparatus of claim 24, wherein said strong base is KOH, and wherein potassium hydrogen phosphate, $K_2HPO_4$, is recovered in a separate regeneration step of said first vessel.

* * * * *